(12) United States Patent
Fanning et al.

(10) Patent No.: US 6,330,639 B1
(45) Date of Patent: Dec. 11, 2001

(54) METHOD AND APPARATUS FOR DYNAMICALLY CHANGING THE SIZES OF POOLS THAT CONTROL THE POWER CONSUMPTION LEVELS OF MEMORY DEVICES

(75) Inventors: Blaise B. Fanning, Cameron Park; Jeffrey R. Wilcox; Khong S. Foo, both of Folsom, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/342,347

(22) Filed: Jun. 29, 1999

(51) Int. Cl.$^7$ .............................. G06F 1/32; G06F 12/02
(52) U.S. Cl. ...................... 711/106; 711/105; 365/222; 365/226; 713/320
(58) Field of Search .................................... 711/100, 105, 711/106, 154; 365/222, 226, 227, 228, 229; 713/320, 323, 324, 330

(56) References Cited

U.S. PATENT DOCUMENTS

| | | | |
|---|---|---|---|
| 4,710,903 | | 12/1987 | Hereth et al. . |
| 5,396,635 | * | 3/1995 | Fung ..................................... 713/323 |
| 5,404,543 | | 4/1995 | Faucher et al. . |
| 5,758,175 | * | 5/1998 | Fung ..................................... 713/323 |
| 5,781,782 | * | 7/1998 | Tachikawa ........................... 713/330 |
| 5,799,198 | * | 8/1998 | Fung ..................................... 713/323 |
| 5,877,651 | * | 3/1999 | Furutani ............................... 327/538 |
| 5,892,959 | * | 4/1999 | Fung ..................................... 713/323 |
| 5,901,103 | | 5/1999 | Harris, II et al. . |
| 5,928,365 | * | 7/1999 | Yoshida ................................ 713/324 |
| 5,966,725 | * | 10/1999 | Tabo ..................................... 711/106 |
| 6,021,502 | * | 2/2000 | Ando ..................................... 713/340 |
| 6,079,025 | * | 6/2000 | Fung ..................................... 713/323 |
| 6,115,823 | * | 9/2000 | Velasco et al. ...................... 713/322 |

* cited by examiner

Primary Examiner—Tuan V. Thai
(74) Attorney, Agent, or Firm—Blakely, Sokoloff, Taylor & Zafman LLP

(57) ABSTRACT

The present invention provides a method, apparatus, and system for dynamically changing the sizes of power-control pools that are used to control the power consumption levels of memory devices. In one embodiment, a request to change the sizes of the memory power-control pools is received. In response to receiving the request to change the sizes of the memory power-control pools, the memory devices are placed in a specific operating mode or power state after being refreshed in a periodic refresh cycle. In response to a signal indicating that all memory devices have been placed in the specific operating mode, powercontrol pools are resized according to pool size values corresponding to the request received.

49 Claims, 14 Drawing Sheets

| DEVICE A |
|---|
| DEVICE B |
| DEVICE C |
| DEVICE D |
| DEVICE E |
|---|
| DEVICE F |
| DEVICE G |
| DEVICE H |
| DEVICE I |
|---|
| DEVICE J |
| DEVICE K |
| DEVICE L |
FIG. 8A
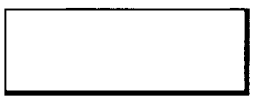
| DEVICE A |
|---|
| DEVICE B |
| DEVICE C |
| DEVICE D |
| DEVICE E |
| DEVICE F |
| DEVICE G |
| DEVICE H |
| DEVICE I |
| DEVICE J |
| DEVICE K |
| DEVICE L |
FIG. 8B

METHOD AND APPARATUS FOR DYNAMICALLY CHANGING THE SIZES OF POOLS THAT CONTROL THE POWER CONSUMPTION LEVELS OF MEMORY DEVICES

FIELD OF THE INVENTION

The present invention relates to the power and thermal management of computer systems and devices. More specifically, the present invention relates to an apparatus, method, and system for dynamically controlling the power consumption levels of memory devices in a memory system.

BACKGROUND OF THE INVENTION

As computer devices and systems continue to advance and become more complex, effective and efficient power and thermal management of computer devices and systems have become more and more critical in system design and implementation. Since computer devices and systems can only operate properly and safely within certain electrical power and temperature ranges, it is important to ensure that there is sufficient power supply to operate various devices when they are needed. In addition, it is also important to ensure that thermal conditions do not exceed some threshold levels that are considered safe for the operations of these various devices. In general, computer devices such as memory devices are designed to have different operating modes or power states that correspond to different levels of performance and power consumption. The different operating modes or power states may include, for example, active mode, standby mode, nap mode, etc. Generally, devices operate faster in active mode than they do in other modes. However, devices also consume more power and generate more heat in active mode than they do in other modes. Keeping all devices in the system in active mode reduces operational latency and therefore improves system overall performance. However, keeping all devices in active mode consumes more power and generates more heat dissipation. In addition, even if the system power supply source is sufficient to power all devices in the system, some of these devices may be idle anyway and therefore it would be a waste of resources to keep them in active mode all the time. System performance requirements and system power usage requirements need to be balanced. To maintain a balance between system performance and system power usage and heat dissipation, it is necessary to keep some number of devices in an inactive mode to reduce power usage and heat dissipation. Depending on the applications and the operational environment, the number of devices to be kept in inactive mode may vary.

The system constraints and tradeoffs described above with respect to computer devices in general apply equally to memory devices in memory system. In their active or most power-hungry mode, memory devices such as dynamic random access memory (DRAM) devices operate faster than they do when they are in inactive mode (e.g., standby or nap mode). However, DRAM devices in their active mode also consume far more power than they do when they are in inactive mode. As a result, to maintain a balance between performance and power consumption (and heat dissipation), some fixed number of DRAM devices may need to be kept in an inactive mode to conserve power and reduce heat dissipation. The number of devices in active mode and the number of devices in inactive mode can be specified by the Basic Input/Output Program (BIOS) at system start up (boot) or system reset. Management of which devices are in active mode and which devices are in inactive mode can be accomplished through a definition of pools of devices that are used to keep track of the operational mode or power state (e.g., active or inactive) of the individual devices. A pool of devices in this context refers to a mapping or list of devices that are in a specific operational mode or power state. For example, one pool may be maintained to keep track of the devices that are in active mode and another pool may be maintained to keep track of the devices that are in inactive mode. Under such a power management scheme, the devices represented in one of the pools are assumed to be operating in a certain operational mode or power state and therefore consuming a certain amount of power. For example, devices that are represented in the active pool are assumed to be operating in active mode. The number of devices in each pool may be examined to determine the amount of power being used by the entire memory system. The different pools utilized to keep track of the operational mode or power state of the various memory devices are also referred to as the power-control or power-saving pools hereinafter.

Conventionally, the number of devices in each pool (also referred to as the size of the pool or pool size hereinafter) is configured or specified by the BIOS at start up or reset and left unchanged during system operations because of the complexity of accounting for the power consumption states of all devices during any proposed transition. For example, a system operator or system user may specify through BIOS setup that the number of active devices is 8 and the number of inactive devices is 24. These two numbers are used to determine the maximum allowable number of devices that can be in the active and inactive pools, respectively. Such a static and inflexible pool configuration is not effective and efficient in balancing the system performance requirements with the system power and heat dissipation requirements because certain events and operating conditions may occur during the course of the system operation which could require the pool configuration to be changed for the system to continue to operate properly, safely, and efficiently. In various instances, for example, it would be useful to be able to change the pool configuration (e.g., change the size of the active pool and inactive pool, etc.) during the system operations in response to various external stimuli or changes in operational conditions since the sizes of the pools are used to maintain a proper balance between system performance and system power consumption (and heat generation). For example, the sizes of the pools may need to be changed in response to a temperature condition that exceeds the system acceptable thermal tolerances or in response to an indication that the system is operating from battery power source due to a power failure or outage. In addition, the sizes of the pools may need to be changed due to changes in the system operational characteristics such as changes in the number of system users which generally affect the usage and therefore the power consumption levels of the memory system.

As a result, there exists a need to dynamically reconfigure or change the sizes of power-control pools of memory devices during the course of the system operations.

SUMMARY OF THE INVENTION

The present invention provides a method, apparatus, and system for dynamically changing the sizes of power-control pools that are used to control the power consumption levels of memory devices. In one embodiment, a request to change the sizes of the memory power-control pools is received. In response to receiving the request to change the sizes of the memory power-control pools, the memory devices are placed in a specific operating mode or power state after being refreshed in a periodic refresh cycle. In response to a signal indicating that all memory devices have been placed in the specific operating mode, power-control pools are resized according to pool size values corresponding to the request received.

BRIEF DESCRIPTION OF THE DRAWINGS

The features and advantages of the present invention will be more fully understood by reference to the accompanying drawings, in which:

FIGS. 8A–8B show an example of a reconfiguration of the power control pools in response to a request to resize the power control pools;

DETAILED DESCRIPTION

In the following detailed description numerous specific details are set forth in order to provide a thorough understanding of the present invention. However, it will be obvious to one skilled in the art that the present invention may be understood and practiced without these specific details.

In the discussion below, the teachings of the present invention are utilized to implement a method and apparatus for dynamically changing the sizes of memory power-control pools that are used to keep track of and control the operational states of various memory devices. In one embodiment, the refresh process normally used to refresh the various memory devices is modified to make the various memory devices enter a specific operational state, e.g., the nap state, after being refreshed in response to a request to change the sizes of the memory power-control control pools. After the various memory devices have entered the specific operational state (e.g., the nap state), the sizes of the memory power-control pools can be changed to new values according to the request. In one embodiment, the request to change the sizes of the memory power-control pools can be initiated by a processor or other units that have a need for changing the sizes of the memory power-control pools. In one embodiment, the request to change the sizes of the memory power-control pools can also be initiated, without system software intervention, in response to detecting a specified system event, for example a signal from a system thermal control unit or a memory thermal control unit indicating that temperature has exceeded a threshold level. The teachings of the present invention are applicable to any scheme, method and system for power management of memory devices. However, the present invention is not limited to the power and thermal management of memory devices and can be applied to the power and thermal management of other devices.

Figure 1:
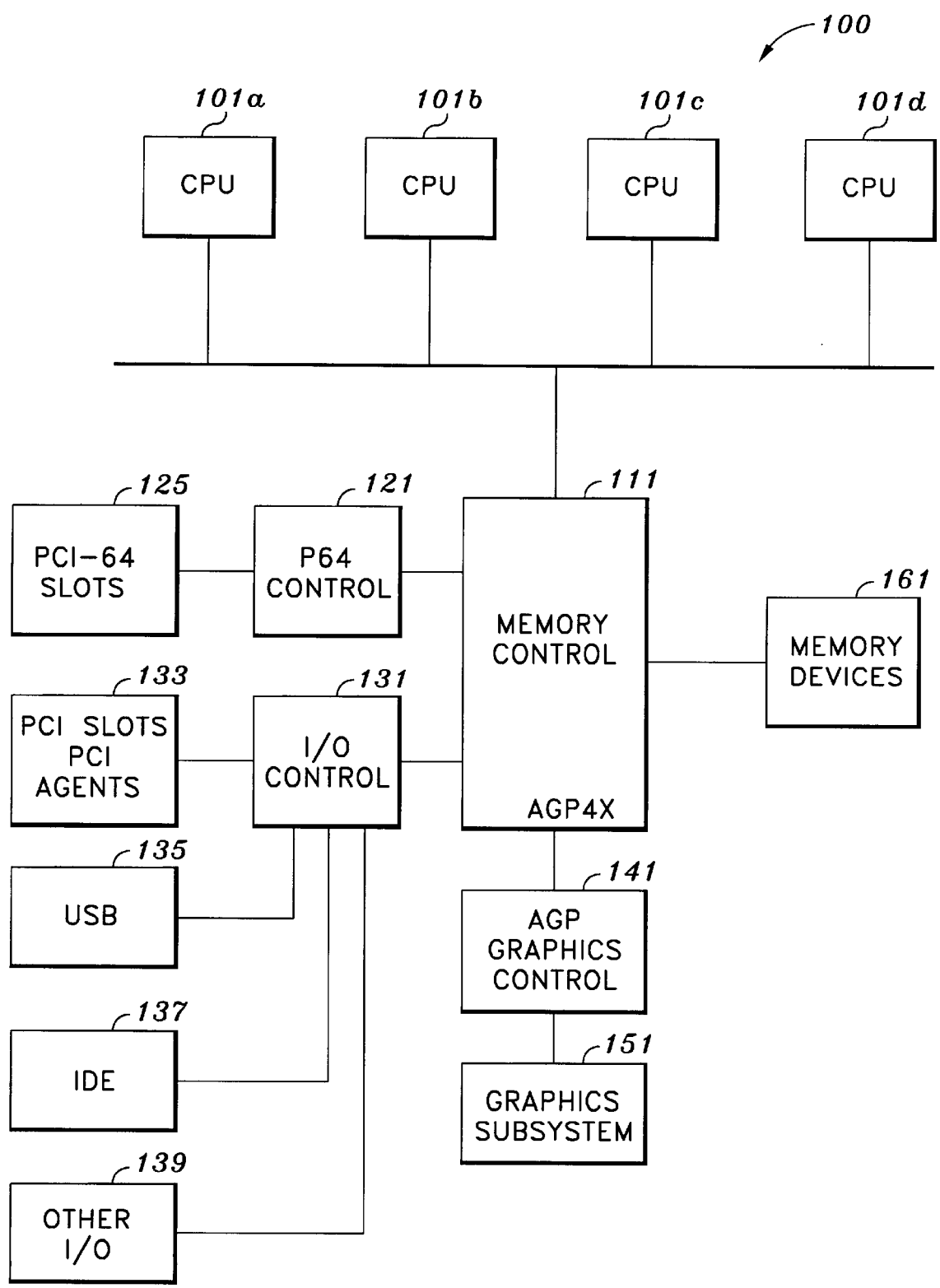
FIG. 1 is a block diagram of one embodiment of a system implementing the teachings of the present invention.

FIG. 1 shows a block diagram of one embodiment of a system configuration in which the teachings of the present invention are implemented. The system configuration 100 includes a plurality of central processing units (CPUs) 101*a–d*, a memory control hub (also referred to as memory control unit) 111, a P64 control unit 121, an Input/Output (IO) control unit 131, a graphics controller 141 coupled to a graphics subsystem 151, and a plurality of memory devices 161. For the purposes of the present specification, the term "processor" or "CPU" refers to any machine that is capable of executing a sequence of instructions and shall be taken to include, but not be limited to, general-purpose microprocessors, special purpose microprocessors, multi-media controllers and microcontrollers, etc. In one embodiment, the CPUs 101*a*–101*d* are general-purpose microprocessors that are capable of executing an Intel Architecture instruction set. The CPUs 101*a*–101*d*, the P64 control unit 121, the IO control unit 131, and the AGP graphics control unit 141 access the system memory devices 161 via the memory control unit 111. The memory control unit 111, in one embodiment, is responsible for servicing all memory transactions that target the system memory devices 161. The memory control unit 111 can be a stand-alone unit, an integrated part of a chipset, or a part of some larger unit that control the interfaces between various system components and the system memory devices 161. The P64 control unit 121 provides the interface control between a plurality of PCI-64 slots 125 and the memory control unit 111. The IO control unit 131 provides the interface control between the memory unit 111 and various IO devices and ports including the PCI slots and PCI agents 133, a plurality of USB ports 135, a plurality of IDE ports 137, and other IO devices 139. The AGP graphics control unit 141 provides the interface control between the graphics subsystem 151 and the memory control unit 111. The structure and functions of the memory control unit 111 are described in greater details below.

For the purposes of the present specification, the memory devices 161 are assumed to be dynamic random access memory (DRAM) devices. It is well known that DRAM is a type of RAM that uses volatile storage cells which are periodically refreshed in order to hold data. The rate of refresh or frequency of refresh varies depending upon the type DRAM used, the amount of memory installed, the configuration of the system memory, etc. In the discussion that follows, it is also assumed that the memory devices used are RAMBUS® DRAMs (also referred to as RDRAMS) that are designed by Rambus Inc. of Mountain View, Calif. Everything discussed herein, however, is equally applicable to other types of DRAMs including conventional DRAMs, fast page mode (FPM) DRAMs, extended data out (EDO) DRAMs, burst extended data out (BEDO) DRAMs, synchronous DRAMs (SDRAMs), double data rate SDRAMs (DDR SDRAMs), synchronous-link DRAM (SLDRAMs), etc.

Figure 2:
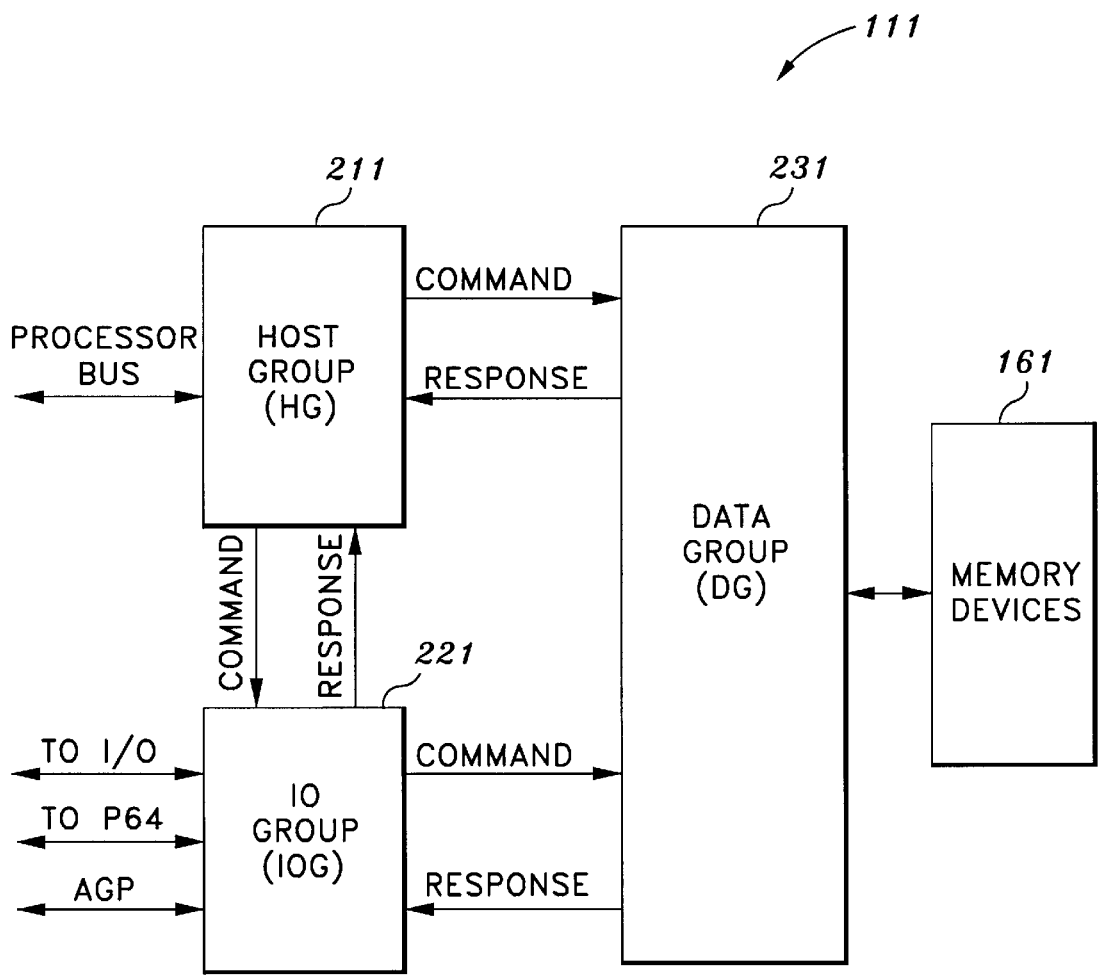
FIG. 2 shows a block diagram of a memory controller having a memory power consumption control mechanism.

FIG. 2 shows a block diagram of one embodiment of the memory control unit 111 described in FIG. 1. In this embodiment, the memory control unit 111 contains three major blocks, the host group (HG) 211, the IO group (IOG) 221, and the data group (DG) 231. In one embodiment, the host group 211 functions as a host interface for the memory control 111. Some of the functions performed by the host group 211 include receiving transaction requests from the CPUs 101a–101d, generating appropriate commands to both the IO group 221 and the data group 231, receiving responses from the IO group 221 and the data group 231, and transmitting the responses received to the host (CPUs 101a–101d). In addition, the host group 211 is also responsible for generating snoop requests to the data group 231, receiving snoop responses from the data group 231, and transmitting snoop responses to the host. The IO group 221, in one embodiment, functions as an IO interface for the memory control unit 111. More specifically, the IO group 221 handles the interface functions between the data group 231 and the P64 control unit 121, the 10 control unit 131, and the graphics control unit 141. In one embodiment, the data group (also referred to as data cluster) 231 is responsible for dispatching and completing all memory transactions that target the system RDRAMs. In one embodiment, the data group 231 contains two logical subcomponents: a data unit (Dunit) that performs the intricate mechanics of sending transactions to the RDRAM devices via the RAMBUS channel controller (RAC) and the buffer unit (Bunit) that is responsible for sequencing, buffering, and delivering data that are pulled from or pushed to the RDRAM devices across the memory bus (also referred to as the RAMbus). The Dunit accepts memory read, write, and refresh requests from the Bunit. These requests are decoded to determine the status of the memory pages to which they are targeted. The Dunit then generates the appropriate commands or instructions (also called the packets) necessary to carry out the memory access requests and queues up the packets for transmission across the memory bus. In addition, the Dunit also synchronizes data transfers that cross a clock boundary between the core frequency and the base frequency of the memory bus. The Bunit, in one embodiment, receives requests for memory data from the host group 211 and the IO group 221 and generates the appropriate memory access requests to the Dunit as described above.

Figure 3:
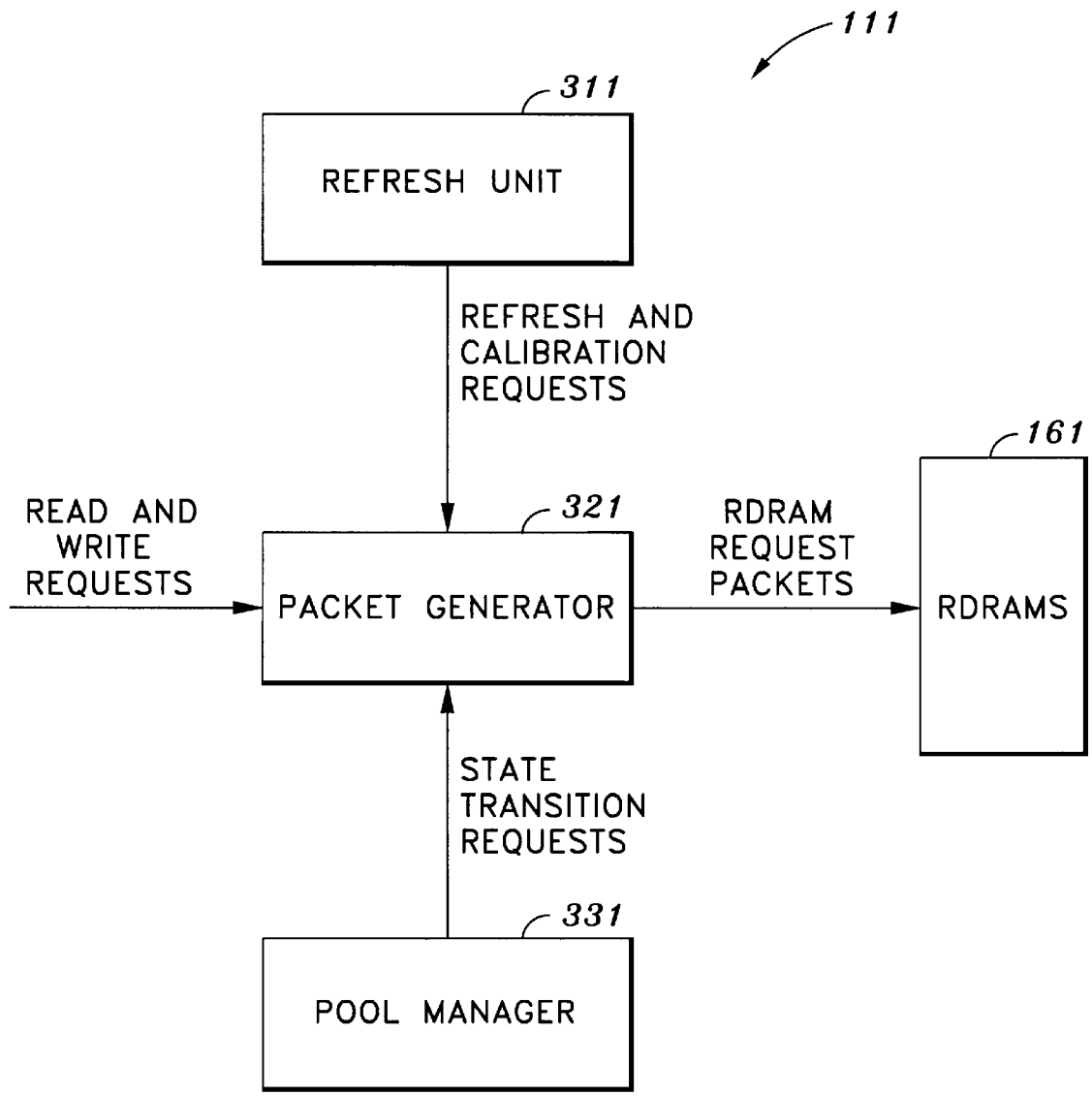
FIG. 3 illustrates a block a diagram of one embodiment of a memory control unit containing a pool manager.

FIG. 3 shows a block diagram of one embodiment of the memory control unit 111 that contains a refresh unit 311, a packet generator 321, and a pool manager 331. The functions of these units and the interactions between them are described in more details below. As mentioned above, the memory control unit (MCU) 111 is responsible for handling memory transactions received from various sources in a timely fashion. The memory transactions received from various sources within the system 100 include memory data read and write requests. In one embodiment, the MCU 111 translates the read and write requests received from the various sources into commands that are understood by the RDRAM devices that are coupled to the MCU 111 via the memory bus. The commands understood by the RDRAM devices (i.e., the RDRAM native requests) are also called RDRAM request packets or simply packets herein. The packet generator unit 321 shown in FIG. 3 is the unit within the MCU 111 that is responsible for creating and sending packets to the RDRAM devices.

In one embodiment, the MCU 311 is also responsible for RDRAM maintenance operations such as refresh and calibration. As explained above, RDRAMs, like any other DRAM technology, uses volatile storage cells which must be refreshed periodically in order to hold data. The MCU 311 perform these maintenance operations at regular intervals by sending packets to the RDRAMs to instruct them to refresh their data or to calibrate their electrical characteristics. In one embodiment, the MCU 111 uses the refresh unit 311 shown in FIG. 3 to perform the RDRAM maintenance operations. In one embodiment, the refresh unit 311 maintains a counter used to keep track of the intervals of time between refresh or calibration cycles. When the refresh unit 311 has determined that a maintenance cycle needs to be performed on the RDRAMs, it places a request to the packet generator 321, which in turn creates the appropriate RDRAM request packets that cause the RDRAM devices to perform the required maintenance functions (e.g., refresh or calibrate).

The pool manager 331 is responsible for managing the power consumption levels (also referred to herein as the operating modes or power states) of the RDRAM devices. As explained above, in order to maintain the balance between system performance and system power usage, memory devices are designed to have different operating modes that correspond to different performance levels (i.e., speeds). In the present embodiment, the RDRAMs are designed to have several operating modes: active, standby, nap, and powerdown. These four different operating modes of the RDRAMs are distinguished by two factors: their power consumption levels and their performance levels. For example, a RDRAM in active mode is ready to immediately service a transaction. However, power consumption is also higher in active mode than in the other modes. The four different power consumption levels and performance levels of the RDRAMs corresponding to the four different operating modes are illustrated in table 1 below, where 4 in the power consumption column corresponds to the highest level of power consumption by the RDRAM and 1 in the performance level column corresponds to the highest level of performance.

TABLE 1

| RDRAM Operating Mode (Power State) | RDRAM Power Consumption Level (4 = highest, 1 = lowest) | RDRAM Performance Level (1 = fastest, 4 = slowest) |
| --- | --- | --- |
| Active | 4 | 1 |
| Standby | 3 | 2 |
| Nap | 2 | 3 |
| Power-Down | 1 | 4 |

As illustrated in table 1, RDRAMs operate faster in active mode than in the other three modes. However, RDRAMs also consume much more power in active mode than in the other three modes. Power consumption and also heat production of memory devices (e.g., RDRAMs in the present discussion) can be reduced by placing one or more RDRAMs in a lower power mode (e.g., standby, nap, or power-down mode). As explained above, power and thermal management in modem and often complex computer systems have become more and more critical in system design and implementation. To achieve some acceptable balance between system performance and system power consumption (which also corresponds to heat dissipation), systems are typically configured so that only a fixed number of memory devices (e.g., RDRAMs) is allowed to operate in active mode. As explained above, depending on the applications and system operational environments, the number of memory devices to be kept in active mode varies. For example, in a system configuration using 12 RDRAM memory devices, certain system constraints may dictate that only a maximum of 4 RDRAM devices can be allowed to be active at any given time. As described above, the maximum number of devices in active mode, in standby mode, or in nap mode, etc., can be specified by the system user through system BIOS at system start up or reset. Management of which devices are in which operating mode (e.g., active, standby, nap, etc.) can be accomplished using a definition of pools of devices (also referred to as power-control pools) that are used to keep track of and control the operating mode or power state of the individual memory devices. A pool in the present discussion refers to a mapping or list of memory devices that are in a specific operating mode or power state.

Continuing with the present discussion, as noted above, RDRAMs can consume a substantial amount of power and generate a substantial amount of heat when operating in active mode. As a result, it would be beneficial to operate as many RDRAMs as are practical in a low power state. In one embodiment, the MCU 111 accomplishes this throttling by placing a number of memory devices (e.g., the RDRAMs) into nap mode in which the memory devices consume much less power and therefore generate much less heat than they do in active mode or standby mode. RDRAMs in nap mode can retain their data but are unable to provide their data to the MCU 111 until they are moved into either active or standby mode. As explained above, to maintain a balance between system performance and power consumption, only some fixed number of memory devices should be put into nap mode at any given time. Consequently, only some fixed number of memory devices are to be kept in active or standby mode at any given time. Computer programs are unaware of the operating mode or power state of any given memory device. Therefore, the operating mode of a given memory device may need to be changed by the MCU before that particular memory device can service a memory transaction.

Referring again to FIG. 3, the pool manager 331 within the MCU 111 is the unit responsible for maintaining the balance between the power consumption of the RDRAM devices and their corresponding performance levels. More specifically, the pool manager 331 keeps track of the operating mode of each individual memory device and takes appropriate actions to move the memory devices from one operating mode to another based upon various factors including the maximum number of devices allowed in each operating mode, which device is required to service a particular memory transaction, etc. In one embodiment, in order to change the operating mode of a particular memory device, the pool manager 331 requests the packet generator to send the appropriate packets (i.e., commands) to the memory device that instruct the memory device to perform the required function (e.g., changing from active to standby mode or changing from standby to nap mode, etc.).

As described above, in one embodiment, the pool manager 331 maintains information about the operating mode of each individual devices (i.e., which devices are in active, standby, or nap modes) through the use of a plurality of pools where each pool refers to a mapping or list of devices that are in a specific operating mode or power state). In one embodiment, the pool manager 331 uses three pools to keep track of the operating modes of the memory devices. One of the pools, called the active pool or pool A, is used to keep track of which devices operating in active mode. The other pool, called the standby pool or pool B, is used to keep track of which devices operating in standby mode. The remaining pool, called the nap pool or pool C, is used to keep track of which devices operating in nap mode. Each of the three pools therefore contains references to the devices that are in a specific operating mode or power state. In one embodiment, the information in the active pool and the standby pool are stored in a set of registers while the nap pool is represented by the subtractive subset of the memory devices that are not found in either the active pool or the standby pool. While the teachings of the present invention are discussed herein using pools as an example of a mechanism for maintaining information about the operating modes of memory devices, it would be obvious to one skilled in the art that the present invention equally applies to other methods, mechanisms or protocols for maintaining and controlling operating modes of the memory devices.

In one embodiment, the MCU 111 can have two modes of operations with respect to the operating mode configuration of the RDRAM devices. In the first mode, all devices are assumed to be in either in active or standby mode. In this configuration, all active devices are represented by tokens in pool A (the active pool), pool B is unused, and pool C subtractively contains all devices that are not represented in pool A. As a result, all devices represented in pool C are assumed to be in standby mode. In the second mode of operation, the memory devices may be in active, standby, or nap modes. All three pools A, B, and C are utilized in this configuration. Pool A represents all active devices, pool B represents devices that are in standby mode, and pool C subtractively is used to represent all devices that are neither in pool A nor pool B and are therefore assumed to be in nap mode.

Figure 4A:
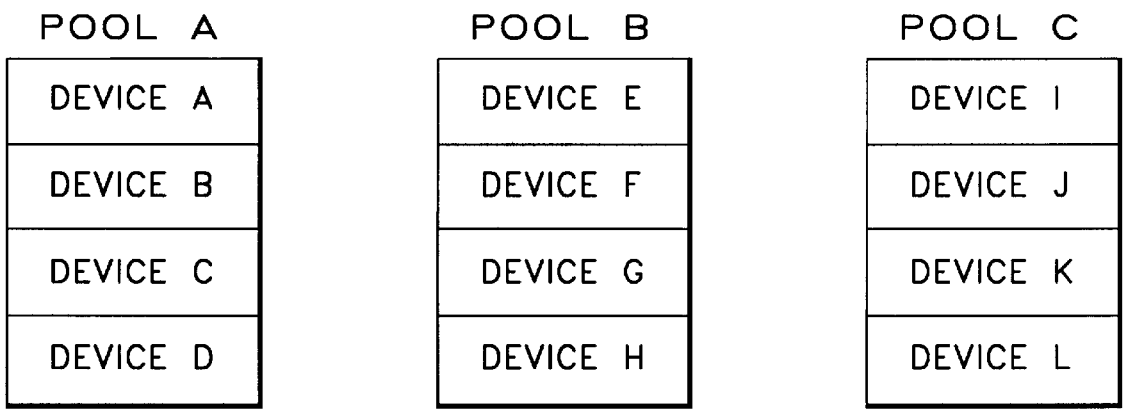
FIGS. 4A–4C illustrate an example of one embodiment of a method for managing various power-control pools that are used to keep track of and control the operational states of memory devices.
Figure 4B:
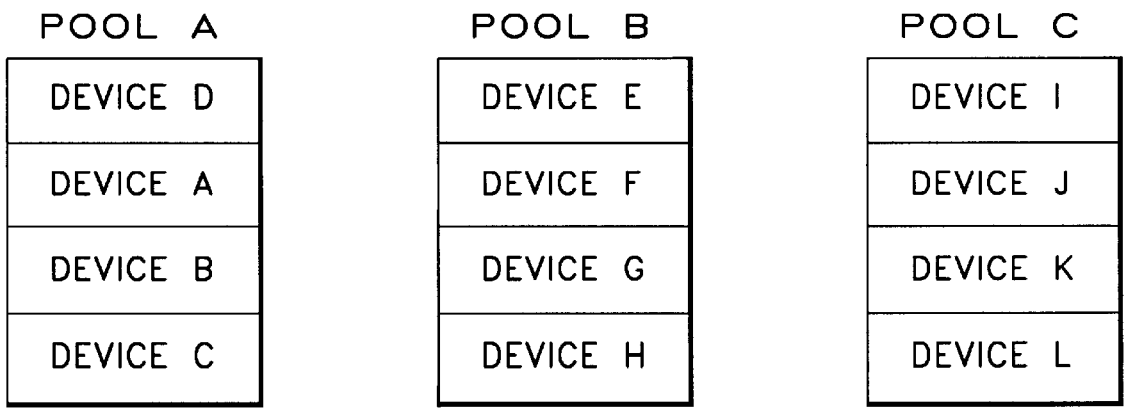
Figure 4C:
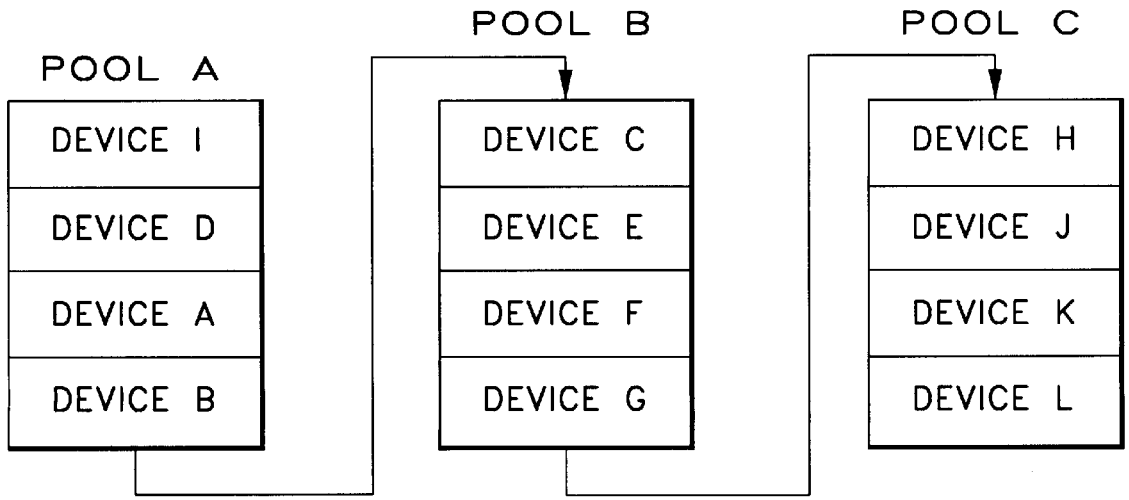

In one embodiment, the pool manager 331 employs true least-recentlyused (LRU) algorithm to maintain the list of devices represented in pools A and B. FIGS. 4A–4C illustrate an example of the configuration and maintenance of the three pools A, B, and C when the MCU 111 operates in the second operation mode (i.e., the memory devices may be in active, standby, or nap modes). In this example, both pool A and pool B are assumed to be set to the sizes of 4 and may therefore each represent up to four memory devices. It is also assumed in this example that there are 12 memory devices in the system, labeled from A to L.

FIG. 4A shows a configuration of the three pools A, B, and C at some given point in the course of system operations. At this stage, as shown in FIG. 4A, devices A–D are represented in pool A and therefore assumed to be in active mode. Devices E–H are represented in pool B and therefore assumed to operate in standby mode. Devices I–L are represented in pool C and therefore assumed to be in nap mode. In the present example, the device listed at the top of the list (e.g., device A in FIG. 4A) is considered the most recently used while the device listed at the bottom of the list (e.g., device D in FIG. 4A) is considered the least recently used. Using the pool representation shown in FIG. 4A, the three pools A, B, and C would be transformed to those represented in FIG. 4B after a read or write to a location in device D. The "D" token representing device D would move to the most recently used position (the top of the list) in pool A, while pools B and C would be unaffected since the change with respect to device D did not affect the number of devices allowed in each pool. Assuming that device I were accessed next, then the three pools A, B, and C would be transformed to those shown in FIG. 4C. In this case, device I was moved to the most recently used position in pool A. Because device I was changed from nap mode to active mode, device C which was the least recently used device in pool A was moved to the most recently used position in pool B in order to maintain the maximum allowable number of active devices in pool A. Similarly, since device C was changed from active mode to standby mode, the least recently used device in pool B (i.e., device H) was kicked out of pool B and subtractively moved to pool C in order to maintain the maximum allowable number of devices in pool B. FIG. 4C therefore represents the pool representation of the three pools A, B, and C after the corresponding devices have changed to their appropriate operating modes.

Figure 5A:
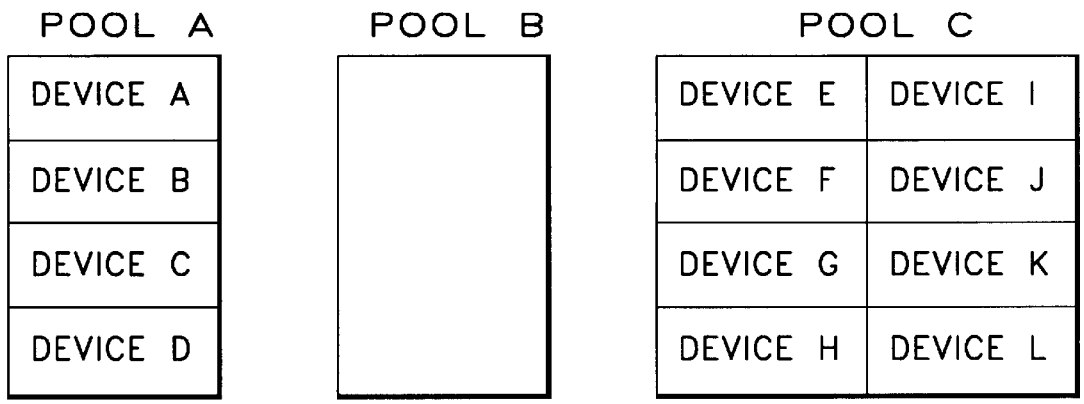
FIGS. 5A–5C illustrate an example of one embodiment of a method for managing power-control pools that are used to keep track of and control the operational states of memory devices.
Figure 5B:
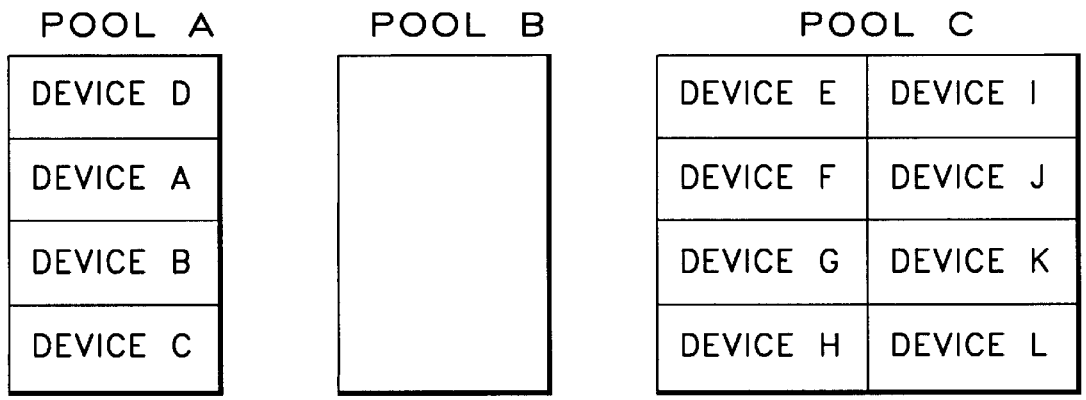
Figure 5C:
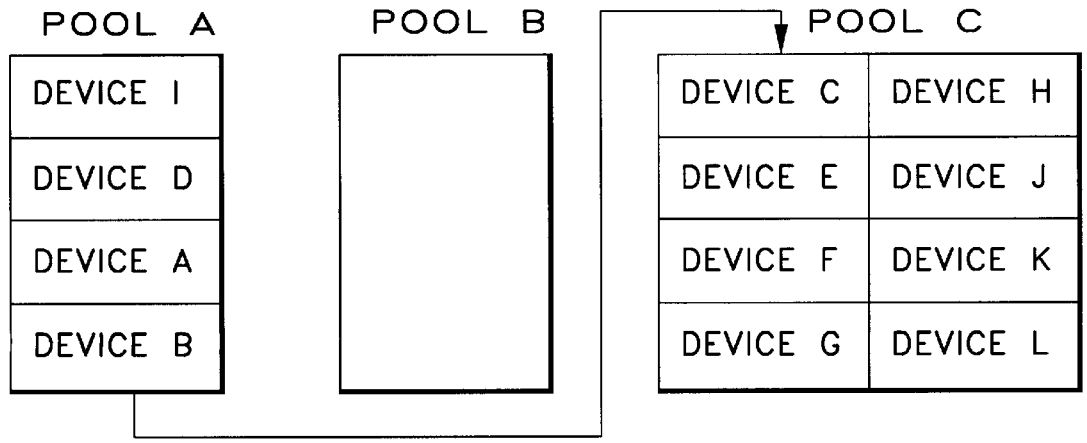

FIGS. 5A–5C illustrate an example of the configuration and maintenance of the three pools A, B, and C when the MCU 111 operates in the first mode (i.e., the memory devices are assumed to operate either in active or standby mode). In this example, pool A is assumed to have the maximum size of four which means that up to four devices are allowed to be active at any given time. Pool B is not used. It is also assumed in this example that there are 12 memory devices in the system, labeled from A to L.

FIG. 5A shows a configuration of the three pools A, B, and C at some given point in the course of system operations. At this stage, as shown in FIG. 5A, devices A–D are represented in pool A and therefore assumed to be in active mode. Devices E–L are subtractively represented in pool C (i.e., since these devices are not represented in pool A, they are assumed to be in standby mode). Again, in the present example, the device listed at the top of pool A (e.g., device A in FIG. 5A) is considered the most recently used while the device listed at the bottom of pool A (e.g., device D in FIG. 5A) is considered the least recently used. Using the pool representation shown in FIG. 5A, the three pools A, B, and C would be transformed to those represented in FIG. 5B after a read or write to a location in device D. The "D" token representing device D would move to the most recently used position (the top of the list) in pool A, while pools B and C would be unaffected since the change with respect to device D did not affect the number of devices allowed in pool A. Assuming that device I were accessed next, then the three pools A, B, and C would be transformed to those shown in FIG. 5C. In this case, device I was moved to the most recently used position in pool A. Because device I was changed from standby mode to active mode, device C which was the least recently used device in pool A was kicked out of pool A and subtractively moved to pool C in order to maintain the maximum allowable number of active devices in pool A. FIG. 5C therefore represents the pool representation of the three pools A, B, and C after the corresponding devices have changed to their appropriate operating modes.

As explained above, to maintain a balance between the system performance, power consumption and thermal safety, it is necessary to keep some number of memory devices in active mode and the rest of devices in lower power states (e.g., standby or nap mode). More specifically, since the number of memory devices operating in each of the power states affects the performance, power consumption and heat production levels of the system, it is useful to keep the sizes of the active, standby, and nap pools within some initial threshold limits to maintain some balance between system performance, power consumption and heat production. Conventionally, the maximum number of devices allowed in each pool is configured or specified using the system BIOS at start up or reset and left unchanged during the course of system operations. Such a static and inflexible pool configuration, while providing an initial system balance between performance and power consumption, is not effective and efficient in balancing the system performance requirements with the system power and heat dissipation requirements. This is because various events and operating conditions may occur during the course of the system operations which could require the initial pool configuration to be changed for the system to continue to operate properly, safely, and efficiently. In other words, the conventional method of pool configuration and control does not account for the dynamic nature of computer system operations and reliability since the changes in the system thermal environment or system usage intensity might require a change in the operating modes of the memory devices which are controlled by the pool manager 331. In various instances, it would be useful to be able to change the sizes of the pools during system operations in response to various external stimuli or changes in operational conditions because the sizes of the pools are used to maintain a proper balance between system performance, system power consumption and heat generation. For example, system overheating could be used as a trigger to place some of the active memory devices into nap mode in order to reduce the heat generation capacity of the memory devices. In addition, the sizes of the pools may need to be changed in response to an indication that the system is operating from lower power source (e.g., battery) due to some power failure or outage. Furthermore, the sizes of the pools may need to be changed due to other changes in the system operational characteristics such as changes in the number of system users, etc.

As explained above, the pool configuration conventionally is left unchanged during system operations because of the substantial complexity created in changing the pool size during operations. This is because appropriate commands must be sent to the RDRAM devices to transition them from one state to another, in addition to the movement or update of values in the registers used to maintain the operating modes or power states of the memory devices. This is necessitated by the mandate that the states of the memory devices match the states reflected inside the MCU 111. The present invention solves this problem by exploiting a characteristic of the refresh operations performed by the refresh unit 311 which requires memory devices to be moved into known power states at regular time intervals. More specifically, in order to perform refresh operations, all memory devices are activated (i.e., transition into active mode) before refresh request packets are sent to them. The refresh unit 311, in performing periodic refresh operations, normally asks that, upon refresh completion, the devices are restored by the packet generator 321 to their states before the activation.

Figure 6:
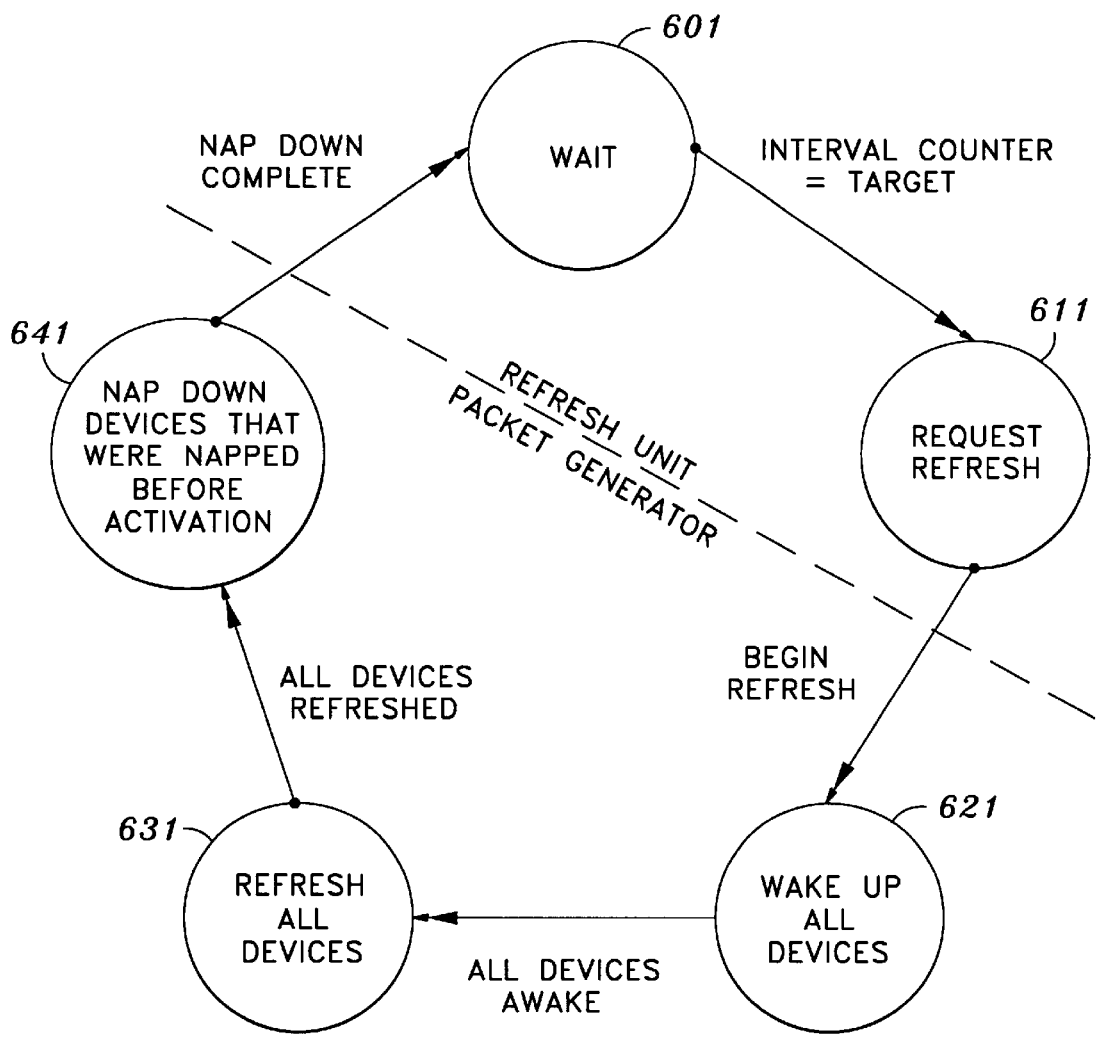
FIG. 6 shows a state diagram of one embodiment of a process for performing normal memory refresh operations.

FIG. 6 shows a state diagram of one embodiment of a process for performing normal refresh operations which reflects states of the memory devices that exist in both the refresh unit 311 and the packet generator 321. The refresh unit 311 enters a wait state at block 601. When the refresh counter that is used to keep track of the time intervals between refreshes reaches a predetermined target number, the refresh unit 311 initiates the refresh operations. At block 611, a refresh request is initiated that begins the refresh operations. As mentioned above, the refresh unit begins the refresh operations by sending a request to wake up or activate all memory devices to the packet generator 321 which in turn issues the appropriate packets to the memory devices. At block 621, a request to wake up all memory devices is initiated. In response to a signal indicating that all devices have been activated, a request to refresh all memory devices is initiated at block 631. In response to a signal indicating that all devices have been refreshed, a request to nap down devices that were in nap mode before the activation is initiated at block 641. After the devices have been restored to their states before the activation, the refresh unit 311 re-enters the wait state at block 601 to wait for the next refresh cycle.

To allow for a dynamic configuration of the power-control pools (i.e., changing the sizes of the pools during system operations), the present invention modifies the refresh process described above so that all devices are placed in a specific mode, for example the nap mode, at the end of the refresh process instead of just napping down the devices that were in nap mode before the activation. This method allows the pool manager 331 to simply reset its pools upon the completion of a refresh operation when such a pool reconfiguration is desired during the course of system operations. In one embodiment, the modified refresh process is initiated by a request from the pool manager 331 that a pool resize or reconfiguration is required. In one embodiment, when all devices are napped down at the end of the modified refresh process, the packet generator 321 and the refresh unit signals the pool manager 331 to indicate that the pools may now be reconfigured or reinitialized. Once the pools have been reconfigured or reinitialized, the pool manager 331 can resume its normal operation since it is capable of maintaining the pools after the states of the devices are known.

Figure 7:
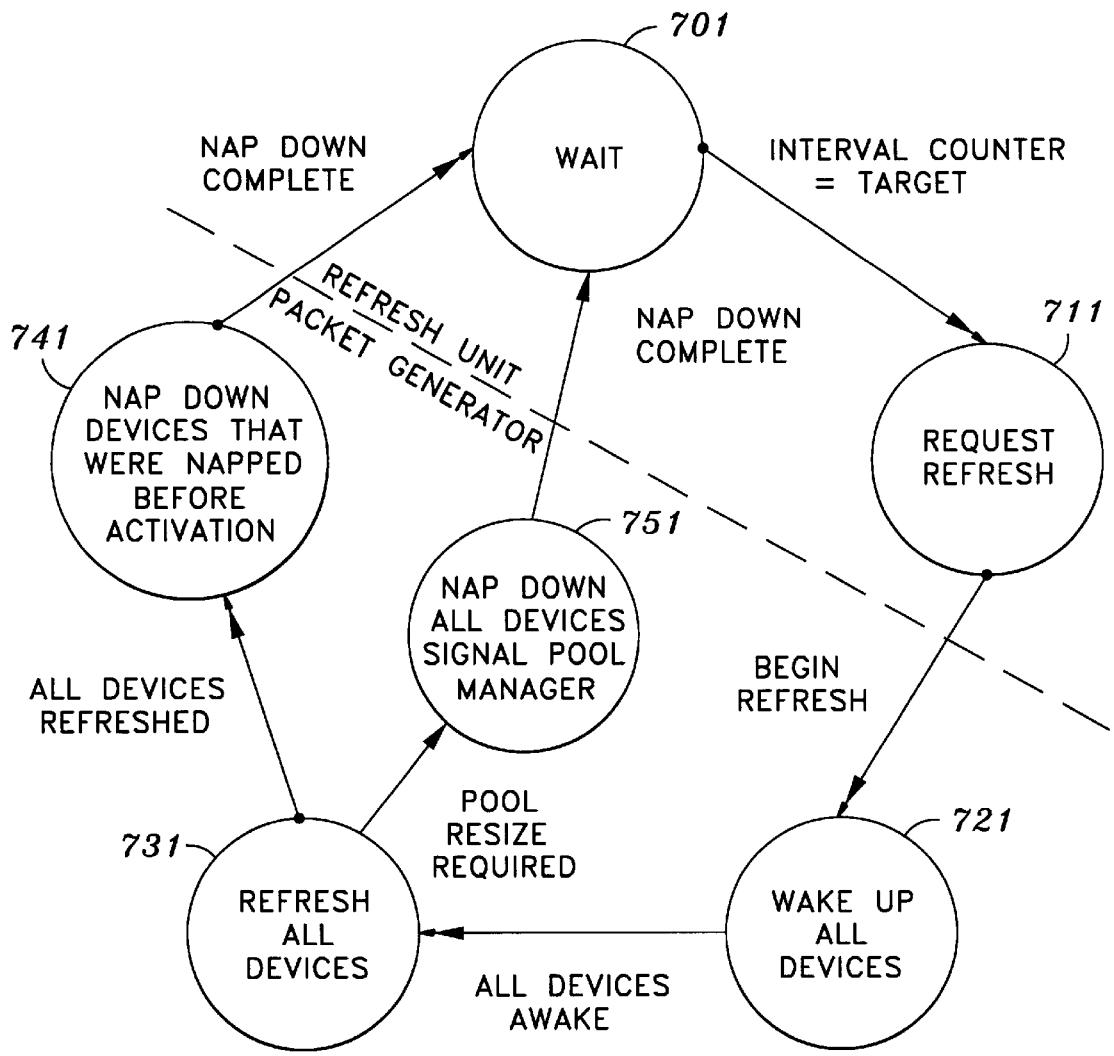
FIG. 7 shows a state diagram of one embodiment of a process for performing refresh operations in response to a request to resize the power control pools.

FIG. 7 illustrates a state diagram of one embodiment of a modified refresh process in response to a request to reconfigure or resize the power-control pools. The refresh unit 311 enters a wait state at block 701. When the refresh counter that is used to keep track of the time intervals between refreshes reaches a predetermined target number, the refresh unit 311 initiates the refresh operations. At block 711, a refresh request is initiated that begins the refresh operations. As mentioned above, the refresh unit begins the refresh operations by sending a request to wake up or activate all memory devices to the packet generator 321 which in turn issues the appropriate packets to the memory devices. At block 721, a request to wake up all memory devices is initiated. In response to a signal indicating that all devices have been activated, a request to refresh all memory devices is initiated at block 731. In this example, it is assumed that the pool manager has initiated a request for pool resize. Because a request to resize the pools has been initiated, instead of proceeding to block 741 to restore the states of the devices that were in nap mode before the activation, the process proceeds to block 751 to nap down all memory devices at the end of the refresh and signal the pool manager when all devices have been napped down. The process then re-enters the wait state at block 701 to await the next refresh cycle. As explained above, by modifying the refresh process, dynamic pool configuration can be achieved. FIGS. 8A–8B show an example of a configuration of the three pools A, B, and C in response to a request to resize the pools. In this example, the active pool is to be resized to one and the standby pool is to be resized to one also. FIG. 8A shows the status of the three pools at some point during system operations. FIG. 8B shows the status of the three pools upon the completion of a request to resize the pools. As shown in FIG. 8B, both pools A (the active pool) and pool B (the standby pool) pool are empty and all memory devices are represented in pool C (the nap pool). The pool manager now can resume its normal operations to maintain the pools according to the new sizes of the pools.

Figure 9:
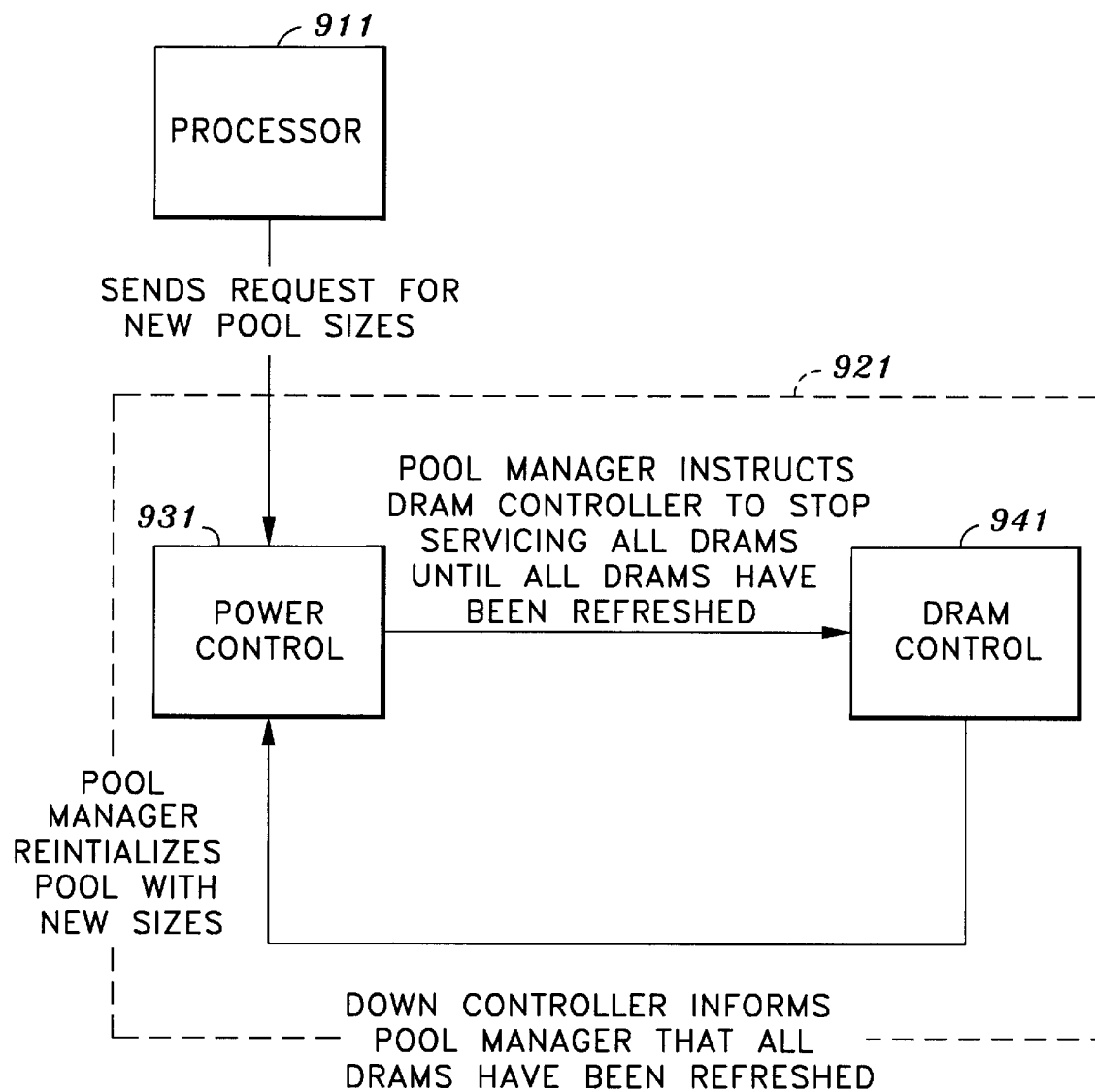
FIG. 9 is a block diagram of one embodiment of an apparatus for dynamically changing the sizes of memory power-control pools.

FIG. 9 shows a block diagram of one embodiment of an apparatus for dynamically changing the sizes of the power-control pools used to maintain and control the operating modes of memory devices. In one embodiment, the power control unit 931 and the DRAM control unit 941 are contained within a memory control unit 921 that employs the teaching of the present invention described herein to dynamically resize the power-control pools. In one embodiment, the power control unit 931 contains a pool managing unit (i.e., a pool manager) that is responsible for maintaining and controlling the sizes of the power-control pools and the operating modes of the memory devices. In one embodiment, the DRAM control unit 941 functions to control the various memory transactions that target the memory devices and also to perform various maintenance operations such as refresh and calibration operations as described above. In one embodiment, the DRAM control unit 941 includes a refresh unit and a packet generator such as the ones that are described in FIG. 3. One or more processor units (e.g., CPUs) are coupled to the power control unit 931 to send requests for pool resize. As explained above, during the course of system operations, it may be necessary or beneficial to change the sizes of the power-control pools in response to various changes in system operations and conditions, for example changes in system thermal environment or system usage levels, in order to maintain a balance between system performance, power consumption, and heat production requirements. When such a change is detected, the processor 911 initiates a request to resize the power-control pools to the power control unit 931. In one embodiment, in response to receiving a request to resize the pools, the pool manager within the power control unit 931 will initiate a request to the DRAM control unit 941 to stop servicing memory transactions until all DRAMs have been refreshed. As described above, in this case, the pool manager will also instruct the DRAM control unit 951 that a pool resize request has been initiated and therefore all memory devices are to be napped down upon completion of the refresh. More specifically, the DRAM control unit 941 will perform the modified refresh process described above so that all memory devices will be placed in a known state (e.g., the nap mode) upon completion of the refresh. The pool manager within the power control unit 931 will then reinitialize the pools with new sizes upon receiving a signal from the DRAM control unit 941 that all memory devices have been refreshed and placed in a specific state (e.g., nap mode). After reinitializing the pools, the pool manager can now resume its normal operations to maintain and control the pools using the new pool sizes corresponding to the request received from the processor 911. In one embodiment, the processor 911 can supply the information indicating the new sizes with the request to resize. In another embodiment, the new size information can be pre-stored and the pool manager can determine which new sizes to be used by the type of request received from the processor 911.

Applying the teachings of the present invention which enable the dynamic configuration of the power-control pools, system software or programs can be modified or designed to monitor system thermal conditions and generate appropriate requests to the power control unit to change the sizes of the pools when necessary, as illustrated in FIG. 9, to keep the system operation within a safe temperature region.

Unfortunately, thermally induced errors might prevent the system from operating normally and therefore may block the system software from having its chance to remedy any potentially damaging conditions. More specifically, system software may not respond fast enough or may itself become inoperable due to thermal errors. Because of this, there exists a need for dynamically changing the sizes of the power-control pools without system software interventions. To solve this problem, the teachings of the present invention can be utilized to provide for a mechanism that allows the memory controller to respond to various thermal conditions in a configurable manner that is capable of throttling down the power consumption levels of the memory devices quickly and without system software intervention. In one embodiment, the pool manager described above can be coupled to receive a signal indicating that a thermal condition exceeding some threshold level (i.e., thermal overload) has been detected. The signal indicating such a thermal overload condition can come from external hardware or thermal sensor responsible for monitoring the thermal conditions at component or system level. In addition, the signal indicating the thermal overload condition can come from other hardware that monitors the thermal conditions of the memory devices themselves. In one embodiment, either condition will cause the system hardware to respond to change the sizes of the power-control pools to some safe values in order to quickly reduce the power consumption level of the memory system. In one embodiment, safe size values of the pools can be provided by the system software and stored in a register. For example, the information indicating the sizes of the active, standby, and nap pools can be provided by the system software and stored in a register accessible by the pool manager. When a thermal overload condition is detected, the pool manager will resize the pools according to the safe size values stored in the register to reduce the power consumption level of the memory devices to a level that is considered safe. The sizes of the pools that are considered safe, of course, can vary depending on the system configuration, the power consumption levels of memory devices in different power states, the severity of the thermal overload conditions, etc. Moreover, different levels of safe size values can be provided for different system events or variations thereof.

Figure 10:
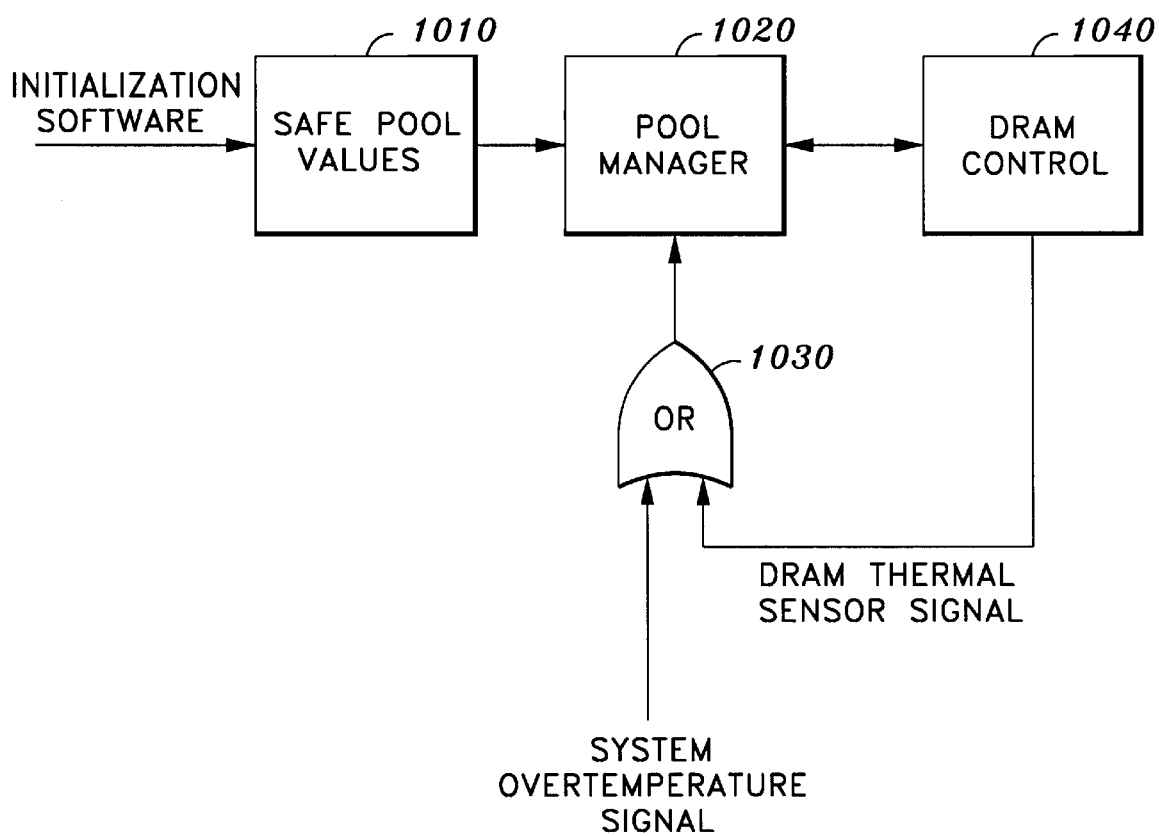
FIG. 10 is a block diagram of one embodiment of an apparatus for dynamically changing the sizes of memory power-control pools.

FIG. 10 shows a block diagram of one embodiment of an apparatus for dynamically changing the sizes of the power-control pools in response to various system events without system software intervention. In one embodiment, the pool manager 1020 is responsible for controlling the sizes of the power-control pools without system software intervention. In one embodiment, one or more registers are utilized to store the sizes of the pools that are considered safe sizes to be used by the pool manager 1020 when it is necessary to resize the pools in response to some specified events indicated by the output signal of the OR gate 1030. The safe sizes or any variations thereof, in one embodiment, can be provided or programmed by system software. In one embodiment, the inputs to the OR gate 1030 can come from two different sources. One of the two inputs to the OR gate can come from some hardware device responsible for monitoring the thermal conditions of specific components at the component level or the system at the system level. The other input to the OR gate 1030, in one embodiment, comes from a thermal sensor or hardware device responsible for monitoring the thermal conditions of the memory system. In one embodiment, the output signal of the OR gate 1030 is used to indicate to the pool manager 1020 that a thermal overload condition has been detected. In response to the output signal of the OR gate 1030, the pool manager 1020 initiates a request to the DRAM controller 1040 to resize the pools as described above, using the safe size values stored in the register 1010.

Figure 11:
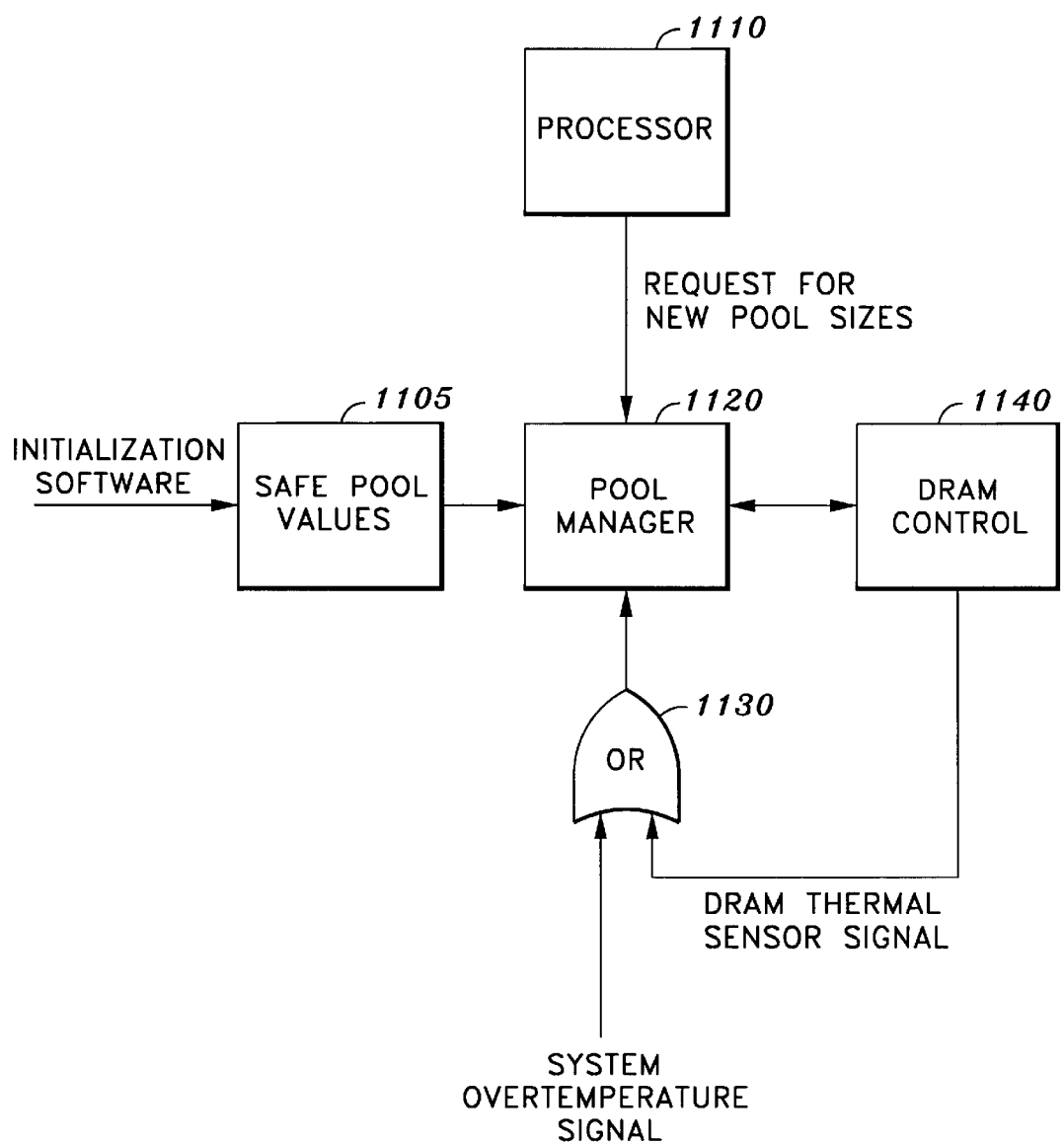
FIG. 11 shows a block diagram of one embodiment of an apparatus for dynamically changing the sizes of memory power-control pools.

FIG. 11 shows a block diagram of one embodiment of an apparatus for dynamically changing the sizes of the power-control pools in response to a resize request from a processor (illustrated in FIG. 9) or in response to a hardwaredetected signal indicating a thermal overload condition (as shown in FIG. 10). In this embodiment, either a resize request received from the processor 1110 or a signal from the OR gate 1130 will trigger the pool manager 1120 to generate a request to the DRAM controller 1140 to resize the pools using the modified refresh process described above. As explained above, if the processor initiates the request to resize, the new size values can be supplied by the processor 1110 at the time of the request. The new sizes values can also be pre-stored and determined by the pool manager 1120 based upon the type of the request received from the processor 1110. If the output of the OR gate 1130 signals a thermal overload condition, the safe size values to be used can be retrieved from the register 1105. In one embodiment, the register 1105 can be programmed by system software. Thus, in this configuration, the pool manager 1120 can dynamically change the sizes of the pools in response to a resize request from the processor 1110 or in response to a signal from the OR gate 1130 indicating a thermal overload condition.

Figure 12:
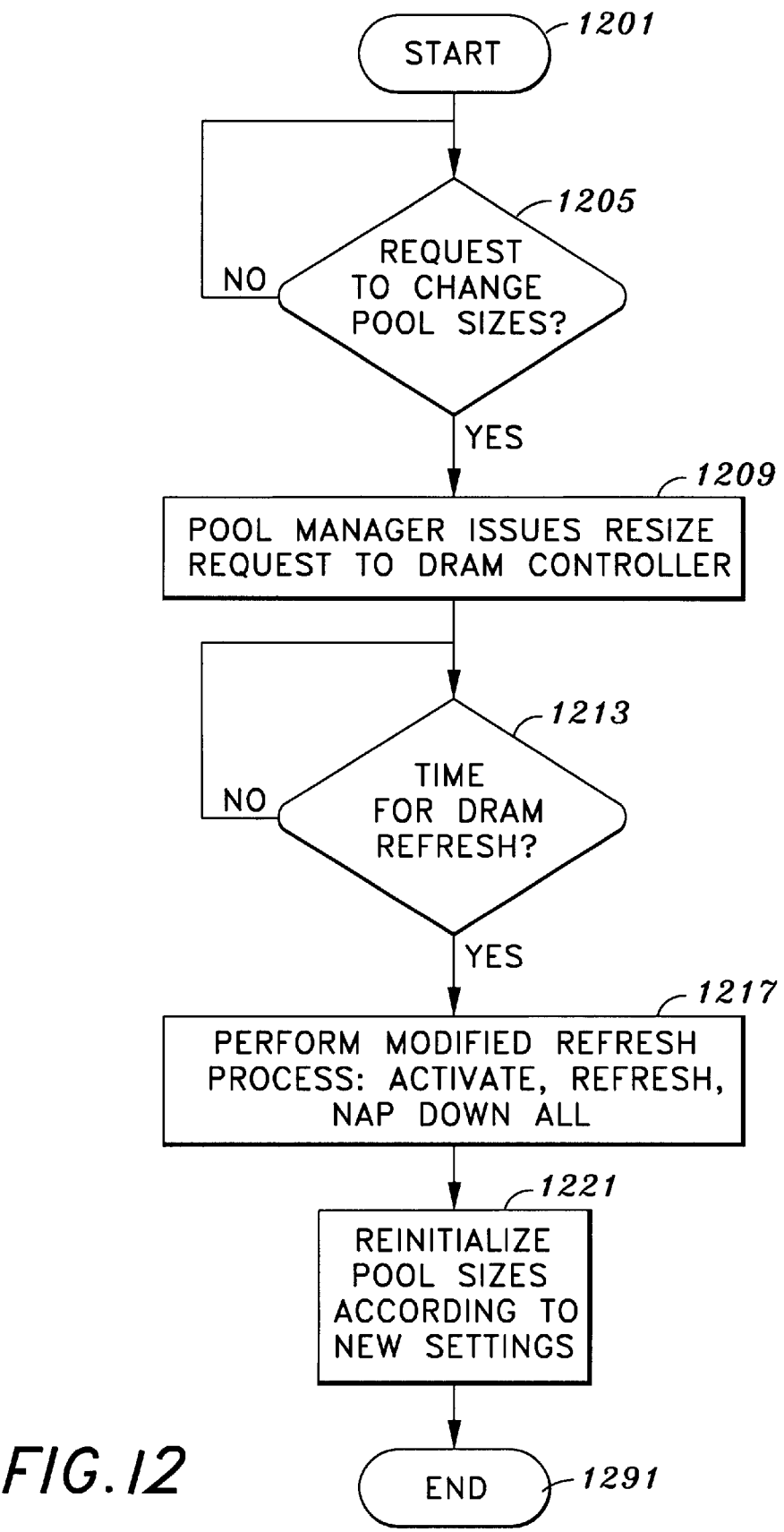
FIG. 12 shows a flow diagram of one embodiment of a method for dynamically changing the sizes of memory power-control pools in response to a request from a processor.

FIG. 12 illustrates a flow diagram of one embodiment of a method for dynamically changing the sizes of the power-control pools in response to a request to resize from a processor or other system units. The method 1200 starts at block 1201 and proceeds to loop 1205. At loop 1205, a pool manager awaits for a request to resize the pools from the processor. Upon receiving a request to resize from the processor, the pool manager proceeds out of the loop 1205 to initiate a request to a DRAM controller to resize the pools at block 1209. At loop 1213, the DRAM controller proceeds out of the wait loop 1213 when the time to refresh the memory devices has come. At block 1217, in response to the resize request generated by the pool manager, a modified refresh process as described above is performed to place all memory devices in a specific operating mode or power state (e.g., nap mode) at the end of the refresh. In one embodiment, the modified refresh process includes activating all memory devices, refreshing all memory devices, and napping down all memory devices after they have been refreshed. At block 1221, the pools are reinitialized by the pool manager upon receiving a signal indicating that all memory devices have been placed in a known, specific operating mode or power state (e.g., nap mode). The method then proceeds to end at block 1291.

Figure 13:
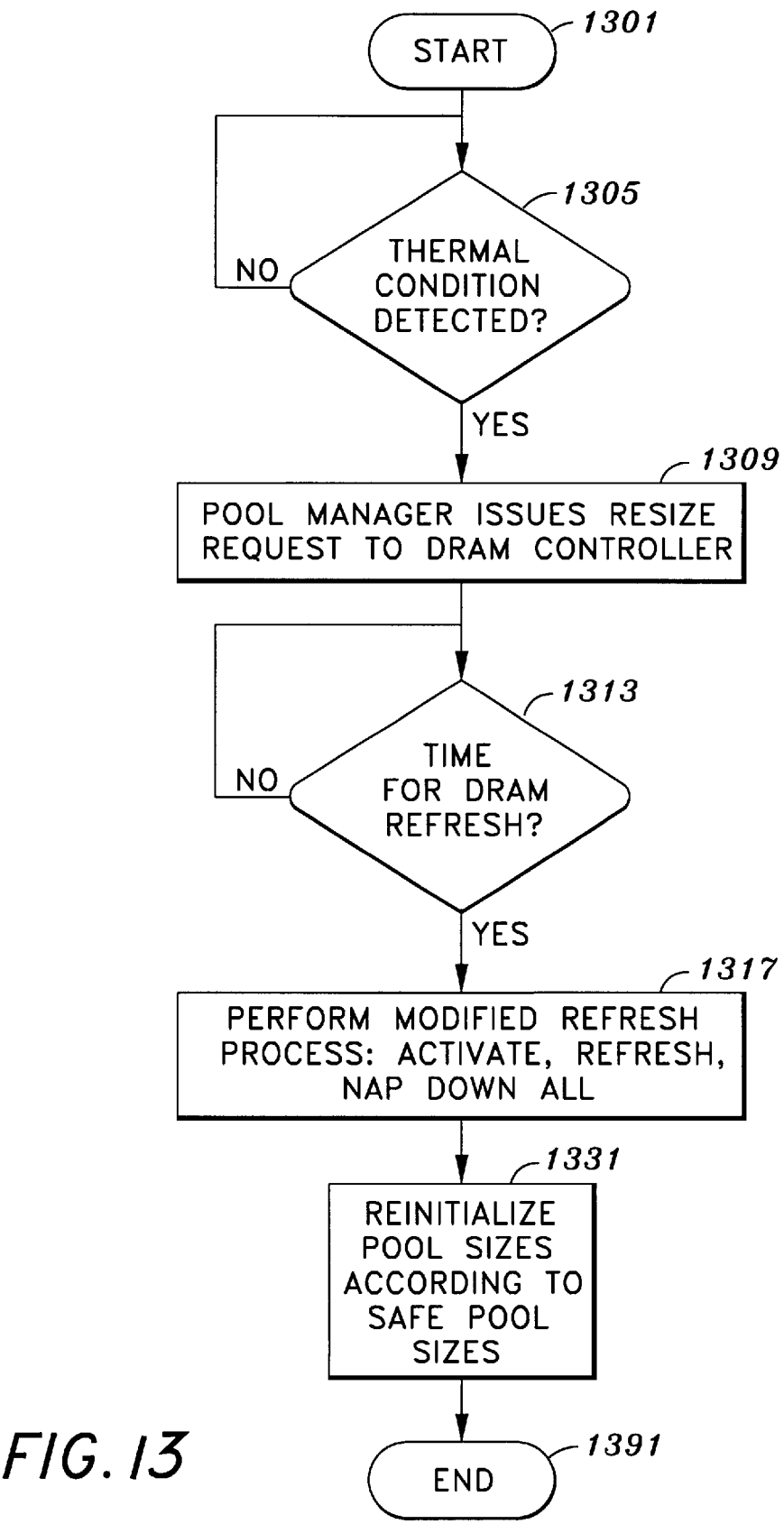
FIG. 13 illustrates a flow diagram of one embodiment of a method for dynamically changing the sizes of memory power-control pools in response to hardware-detected system events.

FIG. 13 illustrates a flow diagram of one embodiment of a method for dynamically changing the sizes of the power-control pools in response to system events without software intervention. The method 1300 starts at block 1301 and enters a wait state at loop 1305. If a signal indicating a thermal overload condition is detected, the method then proceeds out of loop 1305 to generate a request to resize the pools to safe size values at block 1309. At loop 1313, the DRAM controller proceeds out of the wait loop 1313 when the time to refresh the memory devices has come. At block 1317, in response to the resize request generated by the pool manager, a modified refresh process as described above is performed to place all memory devices in a specific operating mode or power state (e.g., nap mode) at the end of the refresh. In one embodiment, the modified refresh process includes activating all memory devices, refreshing all memory devices, and napping down all memory devices after they have been refreshed. At block 1331, upon receiving a signal indicating that all memory devices have been placed in a known, specific operating mode or power state (e.g., nap mode), the pools are reinitialized by the pool manager using safe size values corresponding to the detected thermal overload condition. As described above, in one embodiment, the safe size values to be used in response to a thermal overload condition or variations thereof can be programmed by system software and stored in a register accessible by the pool manager. The method then proceeds to end at block 1391.

Figure 14:
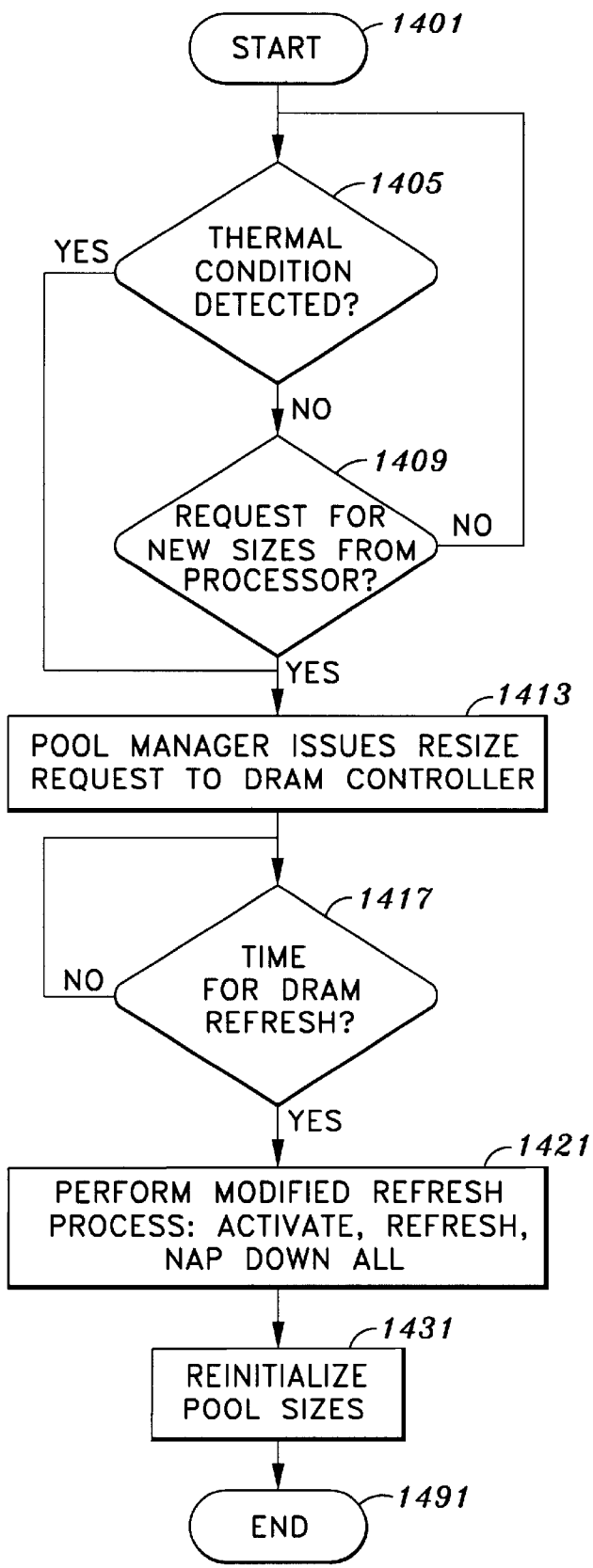
FIG. 14 illustrates a flow diagram of one embodiment of a method for dynamically changing the sizes of memory power-control pools in response to a processor's request or hardware-detected system events.

FIG. 14 shows a flow diagram of one embodiment of a method for dynamically changing the sizes of the power-control pools in response to a request to resize received from a processor (described above with respect to FIG. 12) or in response to a hardware-detected signal indicating a thermal overload condition (as described above with respect to FIG. 13). The method 1400 starts at block 1401 and proceeds to decision block 1405. At decision block 1405, the method proceeds to decision block 1409 if no thermal overload condition is detected. Otherwise the method proceeds to block 1413. At decision block 1409, the method loops back to decision block 1405 if there is no resize request from the processor. Otherwise the method proceeds to block 1413. At block 1413, the pool manager initiates a request to resize. At loop 1417, the DRAM controller proceeds out of the wait loop 1417 when the time to refresh the memory devices has come. At block 1421, in response to the resize request generated by the pool manager, a modified refresh process as described above is performed to place all memory devices in a specific operating mode or power state (e.g., nap mode) at the end of the refresh. In one embodiment, the modified refresh process includes activating all memory devices, refreshing all memory devices, and napping down all memory devices after they have been refreshed. At block 1431, upon receiving a signal indicating that all memory devices have been placed in a known, specific operating mode or power state (e.g., nap mode), the pools are reinitialized by the pool manager using the new size values corresponding to the condition that triggers the resize request. If the resize request is triggered by the processor, the new size values to be used can be either supplied by the processor when the processor initiates the request or pre-stored and determined by the pool manager based on the request type received from the processor. If the resize request is triggered by the signal indicating a thermal overload condition, safe size values corresponding to the detected thermal overload condition are used by the pool manager to reinitialize the pools. As described above, in one embodiment, the safe size values to be used in response to a thermal overload condition or variations thereof can be programmed by system software and stored in a register accessible by the pool manager. The method then proceeds to end at block 1491.

The invention has been described in conjunction with the preferred embodiment. It is evident that numerous alternatives, modifications, variations and uses will be apparent to those skilled in the art in light of the foregoing description.

What is claimed is:

1. A method of dynamically changing the size of a power control pool that is used to manage the power consumption of memory devices in a memory system, the method comprising:

receiving a request to change the size of the power control pool;

placing the memory devices in a specific operating mode after they are refreshed in a periodic refresh cycle; and changing the size of the power control pool based upon a new size value associated with the request in response to a signal indicating that the memory devices have been placed in the specific operating mode.

2. The method of claim 1 wherein the request to change the size of the power control pool is initiated by a processor unit.

3. The method of claim 2 wherein the new size value is supplied by the processor with the request.

4. The method of claim 2 wherein the new size value is pre-stored.

5. The method of claim 1 wherein the request to change the size of the power control pool is initiated by a signal generated by a control device.

6. The method of claim 5 wherein the signal generated by the control device is used to indicate a thermal condition that exceeds a predetermined threshold value.

7. The method of claim 5 wherein the control device is a thermal sensor monitoring the thermal condition of the memory devices.

8. The method of claim 5 wherein the control device is a thermal sensor monitoring the thermal condition of other devices.

9. The method of claim 5 wherein the new size value is maintained in a storage unit.

10. The method of claim 9 wherein the storage unit comprises one or more registers.

11. The method of claim 1 wherein receiving comprises:

receiving the request to change the size of the power control pool from a processor.

12. The method of claim 1 wherein receiving comprises:

detecting a signal from a thermal control unit indicating a thermal overload condition outside of the memory system.

13. The method of claim 1 wherein receiving comprises:

detecting a signal from a thermal control unit indicating that the temperature of the memory system has exceeded a threshold level.

14. The method of claim 1 wherein placing the memory devices in the specific operating mode comprises:

performing a periodic refresh cycle including:
      activating the memory devices;
      refreshing the memory devices after the memory devices have been activated; and
      placing the memory devices in the specific operating mode after the memory devices have been refreshed.

15. The method of claim 1 wherein changing the size the power control pool comprises:

updating the power control pool to reflect that the memory devices have been placed in the specific operating mode; and changing the size of the power control pool to the new size value associated with the request received.

16. The method of claim 1 wherein the specific operating mode is a nap mode.

17. An apparatus for dynamically changing the size of a power control pool that is used to manage the power consumption of memory devices in a memory system, the memory devices having active and inactive operating modes, the apparatus comprising:

receive logic to receive a request to change the size of the power control pool;

special refresh logic to place the memory devices in the inactive operating mode after they are refreshed in a periodic refresh cycle, in response to the request to change the size of the power control pool; and update logic to change the size of the power control pool to a new size value associated with the request after the memory devices have been refreshed and placed in the inactive operating mode.

18. The apparatus of claim 17 wherein the request to change the size of the power control pool is initiated by a processor unit.

19. The apparatus of claim 18 wherein the signal generated by the control device is used to indicate a thermal condition exceeding a predetermined threshold value.

20. The apparatus of claim 18 wherein the receive logic comprises:

logic to receive the request to change size from the processor.

21. The apparatus of claim 18 wherein the new size value is supplied by the processor with the request.

22. The apparatus of claim 18 wherein the new size value is pre-stored.

23. The apparatus of claim 17 wherein the request to change the size of the power control pool is initiated by a signal generated by a control device.

24. The apparatus of claim 23 wherein the control device is a thermal sensor monitoring the thermal condition of the memory devices.

25. The apparatus of claim 23 wherein the control device is a thermal sensor monitoring the thermal condition of other devices.

26. The apparatus of claim 23 wherein the receive logic comprises:

logic to detect the signal generated by the control device.

27. The apparatus of claim 23 wherein the new size value is maintained in a storage unit.

28. The apparatus of claim 27 wherein the storage unit comprises one or more registers.

29. The apparatus of claim 17 wherein the special refresh logic comprises:

activation logic to place the memory devices in the active operating mode;

logic to refresh the memory devices after they have been activated; and logic to place the memory devices in the inactive operating mode after they have been refreshed.

30. The apparatus of claim 17 wherein the update logic comprises:

logic to update the power control pool to reflect that the memory devices have been placed in the inactive operating mode; and logic to change the size of the power control pool to the value associated with the request received.

31. The apparatus of claim 17 wherein the inactive operating mode is a nap mode.

32. An apparatus for dynamically changing the size of a power control pool that is used to manage the power consumption of memory devices in a memory system, the method comprising:

means for receiving a request to change the size of the power control pool;

means for placing the memory devices in a specific operating mode after they are refreshed in a periodic refresh cycle; and means for changing the size of the power control pool based upon a new size value associated with the request in response to a signal indicating that the memory devices have been placed in the specific operating mode.

33. The apparatus of claim 32 wherein the request to change the size of the power control pool is initiated by a processor unit.

34. The apparatus of claim 32 wherein the request to change the size of the power control pool is initiated by a signal generated by a control device.

35. The apparatus of claim 34 wherein the signal generated by the control device is used to indicate a thermal condition that exceeds a predetermined threshold value.

36. The apparatus of claim 34 wherein means for receiving comprises:

means for detecting the signal generated by the control device.

37. The apparatus of claim 32 wherein means for placing the memory devices in the specific operating mode comprises:

means for activating the memory devices; and means for refreshing the memory devices after the memory devices have been activated.

38. The apparatus of claim 32 wherein means for changing the size the power control pool comprises:

means for updating the power control pool to reflect that the memory devices have been placed in the specific operating mode; and means for changing the size of the power control pool to the new size value associated with the request received.

39. An apparatus for dynamically balancing the performance and power consumption levels of a memory system containing multiple dynamic random access memory (DRAM) devices, the multiple DRAM devices having at least two different first and second operating modes, the first operating mode corresponding to a higher level of performance and power consumption than the second operating mode, the apparatus comprising:

logic to maintain a first list based upon a first number, the first list indicating which DRAM devices being in the first operating mode, the first number indicating the maximum number of DRAM devices allowed to be in the first operating mode;

logic to receive a request to change the first number to a new value; and logic to update the first list and the first number in response to the request to change the first number.

40. The apparatus of claim 39 wherein the logic to update the first list and the first number comprises:

logic to request the multiple DRAM devices to be placed in the second operating mode after being refreshed; and logic to reinitialize the first list after the multiple DRAM devices being placed in the second operating mode.

41. The apparatus of claim 39 further comprising:

refresh logic to refresh the multiple DRAM devices periodically.

42. The apparatus of claim 39 wherein the first operating mode is an active mode and the second operating mode is a standby mode.

43. The apparatus of claim 39 wherein the first operating mode is an active mode and the second operating mode is a nap mode.

44. The apparatus of claim 39 wherein the first operating mode is a standby mode and the second operating mode is a nap mode.

45. A memory controller for dynamically balancing the performance and power consumption levels of a memory system containing multiple dynamic random access memory (DRAM) devices, the multiple DRAM devices having at least two different first and second operating modes, the first operating mode corresponding to a higher level of performance and power consumption than the second operating mode, the memory controller comprising:

refresh logic to refresh the multiple DRAM devices periodically; and a pool manager to control the performance and power consumption levels of the multiple DRAM devices comprising:

logic to maintain a first list based upon a first number, the first list indicating which DRAM devices being in the first operating mode, the first number indicating the maximum number of DRAM devices allowed to be in the first operating mode;

logic to receive a request to change the first number to a new value; and logic to update the first list and the first number in response to the request to change the first number.

46. The memory controller of claim 45 wherein the logic to update the first list and the first number comprises:

logic to request the multiple DRAM devices to be placed in the second operating mode after being refreshed; and logic to reinitialize the first list after the multiple DRAM devices being placed in the second operating mode.

47. A system for dynamically balancing the performance and power consumption levels of a memory system containing multiple dynamic random access memory (DRAM) devices, the multiple DRAM devices having at least two different first and second operating modes, the first operating mode corresponding to a higher level of performance and power consumption than the second operating mode, the system comprising:

a processor; and a memory controller coupled to the processor, the memory controller comprising:

refresh logic to refresh the multiple DRAM devices periodically; and a pool manager to control the performance and power consumption levels of the multiple DRAM devices comprising:

logic to maintain a first list based upon a first number, the first list indicating which DRAM devices being in the first operating mode, the first number indicating the maximum number of DRAM devices allowed to be in the first operating mode;

logic to receive a request to change the first number to a new value; and logic to update the first list and the first number in response to the request to change the first number.

48. The system of claim 47 wherein the logic to update the first list and the first number comprises:

logic to request the multiple DRAM devices to be placed in the second operating mode after being refreshed; and logic to reinitialize the first list after the multiple DRAM devices being placed in the second operating mode.

49. A system for dynamically balancing the performance and power consumption levels of a memory system containing multiple dynamic random access memory (DRAM) devices, the multiple DRAM devices having at least two different first and second operating modes, the first operating mode corresponding to a higher level of performance and power consumption than the second operating mode, the system comprising:

a processor to initiate a request to change the number of DRAM devices allowed in the first operating mode;

a thermal control unit to generate a signal indicating a thermal condition exceeding a thermal threshold value; and a memory controller coupled to the processor and the thermal control unit, the memory controller comprising:

refresh logic to refresh the multiple DRAM devices periodically; and a pool manager to control the performance and power consumption levels of the multiple DRAM devices comprising:

logic to maintain a first list based upon a first number, the first list indicating which DRAM devices being in the first operating mode, the first number indicating the maximum number of DRAM devices allowed to be in the first operating mode;

logic to receive a request to change the first number to a new value;

logic to detect the signal indicating the thermal condition; and logic to update the first list and the first number in response to the request from the processor or the signal indicating the thermal condition.

\* \* \* \* \*

UNITED STATES PATENT AND TRADEMARK OFFICE
CERTIFICATE OF CORRECTION

PATENT NO.    : 6,330,639 B1
DATED         : December 11, 2001
INVENTOR(S)   : Fanning et al.

It is certified that error appears in the above-identified patent and that said Letters Patent is hereby corrected as shown below:

Column 5,
Line 35, before "control unit 131', delete "10", insert -- I/O --.

Column 7,
Line 5, delete "modem", insert -- modern --.

Signed and Sealed this

Nineteenth Day of November, 2002

*Attest:*

*Attesting Officer*

JAMES E. ROGAN
*Director of the United States Patent and Trademark Office*